United States Patent [19]
Schmieg et al.

[11] Patent Number: 6,124,428
[45] Date of Patent: Sep. 26, 2000

[54] METHOD OF PROCESSING POLYETHYLENE AND POLYETHYLENE/ELASTOMER BLENDS

[75] Inventors: Joel Edward Schmieg, Humble; Thomas Craig Erderly, Baytown, both of Tex.; Dennis George Peiffer, Annandale; James Joseph Chludzinski, White House Station, both of N.J.

[73] Assignee: Exxon Chemical Patents, Inc, Baytown, Tex.

[21] Appl. No.: 08/906,870

[22] Filed: Aug. 6, 1997

Related U.S. Application Data
[60] Provisional application No. 60/022,432, Aug. 6, 1996.

[51] Int. Cl.⁷ .................................. C08K 5/42; C08L 23/04
[52] U.S. Cl. ........................ 528/487; 528/502 R; 525/95; 525/98; 524/395; 524/575
[58] Field of Search ........................ 525/95, 98; 528/487, 528/502 R; 524/395, 575

[56] References Cited

U.S. PATENT DOCUMENTS

| | | | |
|---|---|---|---|
| 4,267,080 | 5/1981 | Yokoyama et al. | 525/98 X |
| 4,307,009 | 12/1981 | Luders et al. | 260/42.14 |
| 4,548,988 | 10/1985 | Castelein | 525/98 |
| 4,829,116 | 5/1989 | Piesold | 524/278 |

FOREIGN PATENT DOCUMENTS

| | | |
|---|---|---|
| 655199 | 5/1965 | Belgium . |
| 0399445 | 11/1990 | European Pat. Off. . |
| 2823507 | 12/1979 | Germany . |
| 58-212429 | 6/1985 | Japan . |
| 59-176339 | 2/1991 | Japan . |
| 1078738 | 8/1967 | United Kingdom . |
| 1104662 | 2/1968 | United Kingdom . |
| 1155353 | 6/1969 | United Kingdom . |

OTHER PUBLICATIONS

Hackh's Chemical Dictionary, 4th ed., McGraw–Hill, N.Y., p. 27, 1969.

Encyclopedia of Polymer Science & Technology, vol. 8, John Wiley & Sons (1968) pp. 573–575.

Kirk–Othmer Encyclopedia of Chemical Technology, vol. 22, John Wiley & Sons (1983) p. 352.

*Primary Examiner*—Fred Teskin
*Attorney, Agent, or Firm*—Douglas W. Miller; Frank E. Reid

[57] ABSTRACT

Melt processed linear polyethylenes which may optionally contain an elastomer, are shown to exhibit improved processability through the addition of certain surfactants. Among the melt processing parameters improved are reduced head pressure, reduced torque, reduced motor load, reduced or eliminated melt fracture, or combinations of these parameters. The surfactants can be chosen from a non-aromatic alkyl sulfonate or sulfate salt wherein a cation of the salt is selected from the group consisting of Na, K, Li, and other alkali cations and quaternary ammonium cations, said surfactant being essentially free of halogens.

21 Claims, No Drawings

METHOD OF PROCESSING POLYETHYLENE AND POLYETHYLENE/ELASTOMER BLENDS

This is a Regular application of Provisional application Ser. No. 60/022,432 filed Aug. 6, 1996.

BACKGROUND

Linear polyolefins as well as linear polyethylene blends with elastomers, in particular, linear polyethylenes and/or elastomer blends, may be difficult to melt process. Specifically, due to a low shear sensitivity when compared to highly branched polyethylenes, the linear polyethylenes and/or elastomer blends can require more extruder power to pump an equivalent amount of polymer melt. The presence of the elastomer does not necessarily improve the processability of linear polyethylenes. As a result, higher extruder head pressures, higher torque, greater motor loads, and the like can develop, as compared to the highly branched materials.

Increases such as higher motor load, head pressure and/or torque can place undesirable, unacceptable, or unattainable requirements on specific machinery. As for instance, a specific extruder having a specific motor power and gearing, will reach a maximum of motor load, or head pressure, under certain melt temperature conditions for a given polymer being processed. If a polymer or polymer blend is introduced to such an extruder which has such a higher requirement for power in at least one component, such as a polymer having higher molecular weight and/or narrower molecular weight distribution and/or lower shear sensitivity, the extruder will reach a maximum of one or several of these parameters, and be therefore limited in its ability to pump/perform at a similar level to the performance expected/demonstrated with a highly branched or broader molecular weight distribution polymer such as traditional high pressure low density polyethylenes. In the alternative, if melt processing machinery is to be used for certain distribution polymer such as traditional high pressure low density polyethylenes. In the alternative, if melt processing machinery is to be used for certain production/extrusion, and it is not so limited, the prospect of using more power or increasing head pressure for a more difficult to extrude material, while achievable, the user of the machinery would prefer to conserve power.

Additionally, linear polyethylenes and elastomeric blends thereof may exhibit other imperfections during extrusion, specifically blown film extrusion, that may be undesirable, such as melt fracture. These imperfections are undesirable from a quality standpoint. For instance, melt fracture, also known as "shark skin" or "orange peel", can lead to poorer optical properties and/or diminished film physical properties that are generally unacceptable.

The introduction of linear Ziegler-Natta catalyzed polyethylenes in the late '70s and early '80s and extruder owner's attempts to use these polyethylenes in machines that had been previously used to extrude free radical initiated, highly branched, high pressure produced low density polyethylenes provided the early manifestations of these problems. The advent of metallocene catalyzed linear polyethylenes in the '90s, has continued the trend towards polymers that when fabricated into for instance films, offer for example, better physical properties and/or manufacturing economics, but have higher power requirements and/or greater tendency to exhibit melt fracture in the blown film process.

Linear polyethylenes therefore have been the subject of a good deal of effort to eliminate or reduce such problems. Some of the attempts included regearing extruders, designing new and more efficient screws and dies, increasing the power train, addition of expensive fluoroelastomeric processing aids and the like. In nearly every instance, the cost involved has not been inconsequential, as well as the inconvenience. But such costs have been born, due to the desirability of physical properties and/or downgaging possible with the linear polyethylenes.

GB 1,104,662 suggests addition of the salt of alkyl benzene sulfonic acids to polyolefins that purportedly gives a beneficial effect on melt extrusion behavior of the polyolefin. The purported effect is the reduction of the occurrence of "shark skin" or "orange peel". Both alkali and alkaline earth metal salts of alkyl benzene sulfonic acids are purported to be effective. The document is devoid of any identification of the polyethylene, such as molecular weight distribution (MWD), or composition distribution breadth index (CDBI).

GB 1,078,738 suggests that addition of an "external lubricant" to high molecular weight polyolefins can, purportedly, reduce occurrence of melt fracture. Suggested as external lubricants are salts of monovalent to tetravalent metals, and saturated or unsaturated carboxylic acids containing 10 to 50 carbon atoms. Sulfonates corresponding to the fatty acid salts are also said to be suitable. However, stearates, palmitates and oleates are exemplified. This document indicates an equivalence of metal salts of mono to tetra-valent metals.

JP A 59-176339 suggests that when polyolefins are narrowed in MWD or given higher molecular weight, poor fluidity results which in turn gives rise to melt fracture. The solution suggested is addition of fluorinated compounds including potassium salts of fluoroalkylsulfonic acids. These potassium salts are said to exhibit preferable temperature dependence when compared to other cations such as sodium, calcium, lithium and ammonium. The polyolefin/salt combination is said to be effective at 230° C. or higher.

DE 2823507 suggests molding or calendered objects of ethylene polymers and propylene polymers containing alkalai or alkaline earth mono sulfonates from the group alkyl sulfonates, alkenyl sulfonates, alkylaryl sulfonates and succinic acid dialkyl ester sulfonates. Sodium or calcium mono sulfonates are preferred. A suggested benefit is purported to be outstanding separation of the polymer from calendering rolls.

JP 58-212429 (60-106846) suggests polyethylene compositions consisting of 70–95 weight parts of ethylene homopolymer or ethylene alpha-olefin copolymer with a density of at least 0.94 g/cm$^3$; 5–30 weight parts of at least one of low density polyethylene (high pressure), ethylene vinyl acetate, ionomer, and ethylene alpha-olefin copolymer (density not exceeding 0.935 g/cm$^3$); 0.01–5 weight parts of magnesium salt or calcium salt of alkylsulfonic acid or alkylbenzenesulfonic acid; and 0.05–0.5 weight parts of at least one substance selected from the group which includes dibenzylidene sorbitol or its nuclear substituted derivative. The combination is said to be especially useful in air-cooled inflation film.

U.S. Pat. No. 4,829,116 suggests polyolefin molding compositions purportedly having no surface defects that includes a fluorine-containing polymer together with a wax, preferred polyolefins are said to be ethylene copolymers with 1-olefins which contains 3–10 carbon atoms. The fluorine containing compounds are preferably copolymers of vinylidene fluoride and hexafluoropropylene or terpolymers of these monomers with tetra fluoroethylene. Among the suitable waxes enumerated are alkylsulfates or alkyl sulfonates containing straight chain or branched $C_8$ to $C_{26}$ alkyl radicals and an alkalai metal ion, preferably a sodium ion.

There is a need therefore for a relatively inexpensive, easily implemented solution to the processing problems outlined above. Such a solution should also include a material that when included in blown film extrusion of linear polyethylenes and/or linear polyethylene-elastomer blends, will readily melt or incorporate into the melted polyethylene, and not adversely affect physical properties, not be extractable, or negatively impact organoleptics of the film. Specifically, there is a commercial need for a material that may be easily incorporated into polyethylenes and polyethylene elastomer blends, that will reduce or eliminate the increased power requirement (e.g. motor load and or torque), increased head pressure, and melt fracture.

SUMMARY

The present invention is directed to such a material, a certain group of surfactants, and methods of their use which when incorporated into a linear polyethylene or linear polyethylene elastomer blends, can reduce or eliminate processing problems such as melt fracture, increased motor load, increased torque, and combinations thereof and may thereby increase potential production rates.

In certain embodiments of the present invention a method of processing polyethylenes comprising selecting a linear polyethylene, from a group such as linear low density polyethylene (LLDPE), metallocene LLDPE (m-LLDPE), high density polyethylene (HDPE), plastomers, ultra high molecular weight high density polyethylene (UHMW-HDPE), medium density polyethylenes (MDPE), or combinations thereof, adding an elastomer selected from the group consisting of styrene butadiene styrene (SBS); styrene isoprene styrene (SIS); styrene ethylene butadiene styrene (SEBS); styrene ethylene propylene styrene (SEPS); and combinations thereof and adding a surfactant. The surfactant being a non-aromatic alkyl sulfonate or sulfate salt having a cation of either an alkali metal or a quaternary ammonium salt, that is essentially free of halogens. An amount of the surfactant should be added that will be sufficient to improve the melt processability of the polyethylene or polyethylene/elastomer blend. The combination of polyethylenes and surfactant or surfactants and optionally an elastomer or elastomers is then used to melt process the combination into a useful article, such as a film, blow molded part, and the like.

The polyethylenes may be conventional Ziegler-Natta (Z-N) catalyzed materials that generally have a molecular weight distribution characterized by the ratio of weight average molecular weight to the number average molecular weight ($M_w/M_n$) above about 4, or the polyethylenes may be metallocene catalyzed, and will then have an approximate $M_w/M_n$ of less than 3, preferably less than 2.5, and a z-average molecular weight ($M_z$) divided by $M_w$ ($M_z/M_w$) not exceeding 2.

Also contemplated are compositions of a polyethylene having an $M_w/M_n$ less than 3, and optionally an elastomer or elastomers and an alkali metal alkyl sulfonate or sulfate wherein the alkyl group has 6–30 carbon atoms, where the surfactant is present in the polyethylene or polyethylene elastomer blend in a range of from 0.005 to 5 weight percent based on the total weight of the polyethylene or blend. The surfactant should ideally be substantially non-extractable from the final fabricated article.

These and other features, aspects, and advantages of the present invention will become better understood with reference to the following description and appended claims.

DESCRIPTION

In certain embodiments of the present invention, methods of and compositions for reducing or eliminating; a) melt fracture; b) torque; c) increased head pressure; d) increased motor load, e) combinations thereof, and the like, during the melt processing of polyethylenes, polyethylene elastomer blends and other polyolefins are contemplated. These embodiments include both conventional Z-N and metallocene catalyzed polyethylenes (the latter hereinafter "m-polyethylenes), and their combination with certain surfactants and optionally an elastomer, that when so combined achieve the stated melt processing improvements. The combination of polyethylenes and surfactants are particularly well suited to melt processing and fabrication into films, especially blown films, blow molded articles, and the like, while reducing or eliminating one or more of the processability problems discussed above and generally without being extractable from the final fabricated article.

Following is a detailed description of certain preferred combinations of polyethylenes and surfactants and optionally an elastomer and methods of using the combinations in melt processing into useful articles. Those skilled in the art will appreciate that numerous modifications to these preferred embodiments can be made without departing from the scope of the invention. For example: Although methods of improving melt processing of m-polyethylenes or m-polyethylene elastomer blends into films are exemplified, they will have numerous other uses and the films may be formed from other polyolefins or combinations of polyethylenes.

To the extent this description is specific, it is solely for the purpose of illustrating preferred embodiments of the invention and should not be taken as limiting the present invention to these specific embodiments.

Definitions torque—horse power/rpm motor load—amps head pressure—Kpa (psi)

The Encyclopedia of Polymer Science and Technology, Vol. 8, John Wiley & Sons, (1968) pp. 573–575 indicates that for a given polymer, processed at a constant melt temperature, there exists a critical shear rate in the melt fabrication process. Melt processing of the polymer below this critical shear rate will result in a smooth extrudate surface while processing the polymer above it will result in a rough extrudate surface. The observed roughness is commonly referred to as "melt fracture" but may also be described by other terms such as "sharkskin" or "orange peel". For a given polymer, the critical shear rate increases as the melt processing temperature of the polymer increases.

The extent of extrudate roughness will vary depending upon the shear rate at which the polymer is processed. At shear rates just above the critical value, the extrudate roughness normally results in a loss of surface gloss and is typically called "sharkskin". At higher shear rates, the extrudate exhibits periodic areas of roughness followed by areas of smoothness in a more or less regular pattern. This phenomenon is normally described as "cyclic melt fracture". At very high shear rates, the extrudate may become grossly distorted resulting in a what is commonly called "continuous melt fracture".

In general, linear polyethylenes, particularly those with high average molecular weights and/or narrow molecular weight distributions, tend to be more prone to the formation of melt fracture than highly branched polyethylenes, such as conventional LDPE made by high pressure polymerization.

The presence of melt fracture in a fabricated article can lead to poorer optical properties and is generally aesthetically unacceptable. Attempts to eliminate melt fracture in articles fabricated from linear polyethylenes by either reducing the processing shear rate (reduced production rate) or by increasing the processing temperature (increased melt temperature) are generally not commercially viable. In addition, changes in die design to reduce the shear rate (e.g., use of wider die gaps) can result in other problems such as excessive orientation leading to unbalanced article properties. Although fluoroelastomeric processing additives have been used to eliminate sharkskin in linear polyethylenes under certain processing conditions, their use is expensive due to the high cost of the fluoroelastomer.

Polyethylenes

The polyethylenes contemplated in certain embodiments of the present invention, include ethylene alpha-olefin copolymers. By copolymers we intend combinations of ethylene and one or more alpha-olefins. In general the alpha-olefins comonomers can be selected from those having 3 to 20 carbon atoms. Specifically the combinations may include ethylene 1-butene; ethylene 1-pentene; ethylene 4-methyl-1-pentene; ethylene 1-hexene; ethylene 1-octene; ethylene decene; ethylene dodecene; ethylene, 1-butene, 1-hexene; ethylene, 1-butene, 1-pentene; ethylene, 1-butene, 4-methyl-1-pentene; ethylene, 1-butene, 1-octene; ethylene, 1-hexene, 1-pentene; ethylene, 1-hexene, 4-methyl-1-pentene; ethylene, 1-hexene, 1-octene; ethylene, 1-hexene, decene; ethylene, 1-hexene, dodecene; ethylene, propylene, 1-octene; ethylene, 1-octene, 1-butene; ethylene, 1-octene, 1-pentene; ethylene, 1-octene, 4-methyl-1-pentene; ethylene, 1-octene, 1-hexene; ethylene, 1-octene, decene; ethylene, 1-octene, dodecene; combinations thereof and the like permutations. The comonomer or comonomers will be present in the copolymers in the range of from about 0.1 to about 40 mole percent. The actual amount of comonomers will generally define the density range.

Density ranges contemplated to be useful include 0.86–0.97 g/cc and all portions and constituents of the range. Specifically included are the 0.86–0.915 g/cc (plastomers) 0.916–0.925 (LLDPE), 0.926–0.940 (MDPE), and 0.941–0.970 (HDPE). Melt indices contemplated include 0.001–30, preferably 0.5 to 5.0 for blown films, and 0.3–10 for blow molding, and all members of these ranges (melt index in dg/min or g/10 minutes).

Polyethylenes that are produced using metallocene catalysts include ionizing activators as well as alumoxanes.

Included in the embodiments contemplated are those where either m-polyethylenes and Z-N polyethylenes may be blended with each other and/or with other components such as LDPE, (highly branched, high pressure free radical polymerized) and other ethylene copolymers such as ethylene vinyl acetate (EVA), ethylene n-butyl acrylate (EnBA), ethylene methyl acrylate (EMA), ethylene ethyl acrylate (EEA), ethylene acrylic acid (EAA), ethylene methacrylic acid (EMAA), and ionomers of the acids, terpolymers such as ethylene, vinyl acetate, methyl acrylate; ethylene, methyl acylate, acrylic acid; ethylene, ethyl acrylate, acrylic acid; ethylene, methyl acrylate, methacrylic acid; ethylene, methylacrylate, methacrylic acid; and the like.

The polyethylene elastomer combinations described above, in combination with the surfactants described below, will be substantially free of propylene polymers such as polypropylene homopolymers and copolymers. By substantially free we intend that less than 5 wt. % of the total polymer will be a propylene based polymer, preferably less than 3%, more preferably less than 1%, most preferably to totally free of propylene polymers.

Also contemplated are multi-layer blown film extrusions where one or more of the layers can include a polyethylene/surfactant or polyethylene/elastomers/surfactant combination. Such extrusion may include a linear polyethylene layer, a heat seal layer, a barrier (gas and/or vapor) layer, recycle or regrind layer or combinations thereof.

Some of these blend components may affect processing variables in a positive manner, in which case the invention contemplated will include some portion of the below discussed surfactants, possibly less than with an unblended material.

Most polyethylenes will contain various additives well known to those of ordinary skill in the art, including, but not limited to slip, anti-block, anti-oxidants, anti-fogs, acid neutralizers, UV inhibitors, anti-static agents, pigments, dyes, release agents, fungicides, algecides, bactericides, and the like.

As used in this application, the processing temperature of polyethylene in the blown film process will generally be in the range of 300–450° F. (149–232° C.), preferably 350–410° C. (177–210° C.), a point generally above the melting point of the polyethylene and below its degradation or decomposition temperature. This is generally the temperature of the melt exiting the die, but may be measured at any point downstream of the screw elements. The processing temperature will be understood by those of ordinary skill to vary generally by the melt fabrication technique, and within a fabrication technique, processing temperature can vary by the type of processing equipment, or by specific requirements of a particular manufacturer.

Surfactants

The surfactants contemplated include non-aromatic alkyl sulfate or sulfonate salts where the cation is one of an alkali metal, e.g. Li, Na, K, and other alkali cations, or a quaternary ammonium salt. Sodium salts being preferred. The surfactants may also be described as alkali metal alkyl sulfates or sulfonates where the alkyl group is a C6 to C30 alkyl group, preferably C8 to C20, more preferably C12 to C18. The alkyl group may be chosen from the group consisting of branched or straight chain alkenyl, branched or straight chain alkoxy, branched or straight chain hydroxyl substituted alkyl, and combinations thereof Preferred are combinations of branched or straight chain alkenyls and branched or straight chain hydroxyl substituted alkyl alkali metal sulfates or sulfonates, of these the sodium combination is most preferred.

One class of surfactants that are preferred in this application are (X-olefin sulfonates. As stated in the Kirk-Othmer Encyclopedia of Chemical Technology, Vol. 22, John Wiley & Sons, (1983), pg. 352, α-olefin sulfonates are produced by reaction of α-olefin with SO3 in air followed by neutralization with a base to produce the corresponding salt. The sodium salts are the most preferred. Commercial α-olefin sulfonates are a mixture of alkene sulfonates and hydroxy alkane sulfonates. The position of the double bond in alkene sulfonates as well as the hydroxyl group in hydroxy alkane sulfonates varies along the carbon chain of the alkyl group.

More detailed description of the surfactants follows.
The surfactant includes those, of the general formulae:

$$[R_1SO_x]M_1 \qquad \text{I.)}$$

where x=3 or 4
$M_1$ is selected from the group consisting of:
Li, Na, K, and other alkali cations, and $M_1$ optionally includes $NH_4^+$ or quaternary ammonium salts of the structure:

$R_1$ is selected from the group consisting of
branched or straight chain mono or di unsaturated alkenyl,
branched or straight chain alkoxy,
branched or straight chain hydroxyl substituted alkyl, and combinations thereof,
wherein said $R_1$, $R_2$, $R_3$ and $R_4$ are essentially free of halogens; and
$R_2$, $R_3$, $R_4$ are selected from the group consisting of:
branched or straight chain alkyl,
branched or straight chain alkenyl,
branched or straight chain alkoxy,
wherein said $R_2$, $R_3$ and $R_4$ may contain hydroxyl groups; and
wherein the carbon number of said $R_1$, ranges from 6 to 30; and
wherein the carbon number of said $R_2$, $R_3$, $R_4$ ranges from 2 to 8; wherein said surfactant is present in said combination in a range of 0.005 to 5.0 weight percent, preferably 0.01 to 0.5, more preferably 0.03 to 0.35 weight percent based on the total weight of the combination.

Or a surfactant represented by one of the formulae:

$$[R_1SO_x]M_1 \qquad \text{II.)}$$

where x=3 or 4
$M_1$ is selected from the group consisting of:
Li, Na, K, and other cations. $M_1$ optionally includes $NH_4^+$ or quaternary ammonium salts of the structure,

$R_1$ is selected from the group consisting of:
branched or straight chain mono or di unsaturated alkenyl,
branched or straight chain alkoxy,
branched or straight chain hydroxyl substituted alkyl and combinations thereof;
$R_2$, $R_3$, $R_4$ are selected from the group consisting of:
branched or straight chain alkyl,
branched or straight chain alkenyl,
branched or straight chain alkoxy,
wherein said $R_2$, $R_3$ and $R_4$ may contain hydroxyl groups; and
wherein the carbon number of said $R_1$ ranges from 6 to 30; and
wherein the carbon number of said $R_2$, $R_3$, and $R_4$ ranges from 2 to 8.
wherein said surfactant is present in said combination in a range of 0.005 to 5.0 weight percent, preferably 0.01 to 0.5, more preferably 0.03 to 0.35 weight percent based on the total weight of the combination.

The surfactant or surfactants should be substantially or essentially free of halogens. By substantially or essentially free of halogens we intend that the surfactant molecules will have preferably no halogen.

The surfactants contemplated, whether a mixture or a single surfactant should have a melting point less than 240° C. preferably 230° C., more preferably 220° C., most preferably 210° C.

The surfactants may be present in the polyethylene combination in the range of from 0.005–5.0 weight percent, preferably 0.01–0.5, more preferably 0.03–0.35 weight percent (including all elements in these ranges) based on the total weight of the combination. The amount and type of surfactant present will determine the effect on the melt processing characteristics, for instance as shown below, smaller amounts at about 0.35 wt % or below preferably 0.25%, more preferably 0.10 wt %, or below, will primarily function to reduce melt fracture, while amounts above that level, up to the indicated higher levels will begin to also reduce head pressures, torque, motor load or combinations thereof. While greater amounts than the 0.5 levels may be used, adverse extrusion effects may result such as screw slippage.

Those of ordinary skill will appreciate that at higher levels, generally above 0.1 weight percent, the surfactant or a combination of surfactants will be effective in reducing not only melt fracture, but motor load, torque, head pressure and the like by at least 5% for one or more of these variables. Generally at lower levels than 0.1 weight percent the reductions of these motor load, torque and head pressure parameters will be less, but the surfactants will be effective in reducing melt fracture.

The mechanism of melt fracture reduction is believed to involve the formation of a layer of surfactant on the internal metal surfaces of key components of the melt processing equipment. This layer effectively increases the velocity of molten polymer at the metal interface thereby minimizing the polymer flow distortions that occur as the molten polymer exits the melt processing equipment which typically results in melt fracture. The use of a relatively high concentration of surfactant, e.g. 0.5 weight percent, will generally result in a faster rate of metal surface coating and, therefore, a more rapid rate of reduction in melt fracture of the final fabricated article. At lower surfactant levels, the metal surface coating rate, and the corresponding melt fracture reduction rate, will be slower.

It should be noted that when discussing the weight percent of surfactant, we intend that this be based on the total weight of the surfactant and polyethylene (or polyethylene blend). If other constituents are included the amount of surfactant should be then calculated on a parts per hundred parts of polyethylene basis. Likewise if a blend constituent (with the linear m-polyethylene) assists in improving processability, then the contemplated amount of surfactant will be that level sufficient to achieve the intended effect, e.g. reduction of one or more of melt fracture, motor load, torque, or head pressure.

For example, blends of one or more of the above surfactants may be used to achieve the desired results, as well as combinations of polyolefin waxes and/or fluoroelastomers and/or fluoropolymers with one or more surfactants. For instance one or more of the surfactants listed above may be combined with a polyethylene wax in ratios from 10–90 and 90–10 and all elements in and between these ranges, and a similar combination with fluoroelastomers and/or fluoropolymers is also contemplated, as well as surfactant/polyethylene wax/fluoroelastomer combinations.

If the polyethylene composition or the film made therefrom contain the optional elastomer or elastomers, the thermoplastic elastomeric films of certain embodiments of the present invention comprise a blend of at least two copolymers. One copolymer is an elastomeric block copolymer containing blocks of a monoalkenyl arene copolymer and a conjugated diene polymer. The second component is selected from a group of highly amorphous thermoplastic ethylene copolymers having the primary characteristic of low crystallinity and low density (such as m-plastomers and/or m-LLDPE). Optional ingredients which may also be included in the polymer blends of the present invention include small amounts of conventional anti-block concentrates and slip agents, as well as antioxidants and stabilizers.

The Elastomeric Block Copolymer

The elastomeric block copolymers contemplated for use herein are known materials having blocks of monoalkenyl arene polymer and blocks of conjugated diene polymer. The polymer blocks have the general configuration:

A-B-A and are arranged such that there are at least two monoalkenyl arene polymer end blocks A and a least one elastomeric conjugated diene mid block B. These polymer blocks may optionally be hydrogenated to eliminate the unsaturation in the mid block B. The monoalkenyl arene copolymer blocks comprise from 8% to about 55% by weight of the block copolymer. The molecular weight of the block copolymer is such that its melt index is less than about 100 as determined by ASTM Method D 1238 entitled "Standard Test Method for Flow Rates of Thermoplastics by Extrusion Plastomer" Condition E.

The term "monoalkenyl arene" includes those particular compounds of the benzene series such as styrene and its analogues and homologues including o-methyl styrene and p-methyl styrene, p-tert-butyl styrene, 1,3 dimethyl styrene, p-methyl styrene in other ring alkylated styrenes, particularly ring methylated styrenes, and other monoalkenyl polycyclic aromatic compounds such as vinyl naphthalene, vinyl anthrycene and the like. For the present invention, the preferred monoalkenyl arenes are monovinyl, monocyclic arenes such as styrene and p-methyl styrene, styrene being particularly preferred.

It is important to embodiments of present invention that the amount of monoalkenyl arene not exceed an amount of 55%, nor comprise an amount less than 8% by weight of the copolymer. Preferred amounts of monoalkenyl arene in the block copolymer are from 25% to 35%. Optionally, the monoalkenyl arene will be in an amount of about 30%. If a monoalkenyl arene is used in excess of 55 weight percent, the block copolymer is too stiff for the instant blends. The elastomeric block copolymers are optionally "oil extended" which is the addition of a hydrocarbon oil and allows for improved processability and softer films. The oils are optionally added to the commercial elastomeric copolymers in amounts of between 10% to 40%.

The block B comprises homopolymers of conjugated diene monomers, copolymers of two or more conjugated dienes, and copolymers of one or more of the dienes with a monoalkenyl arene as long as the blocks B are predominantly conjugated diene units. The conjugated dienes preferably used herein contain from 4 to 8 carbon atoms. Examples of such suitably conjugated diene monomers include: 1,3 butadiene (butadiene); 2-methyl-1,3 butadiene; isoprene; 2,3 dimethyl-1,3 butadiene; 1,3 pentadiene (piperylene); 1,3 hexadiene; combinations thereof, and the like. Hydrogenation of the unsaturated elastomer (Block B) results in a saturated tri-block copolymer (A-B-A).

For the instant films, the preferred monoalkenyl arene polymer is polystyrene; and the preferred conjugated diene polymers are polybutadiene and polyisoprene, especially preferred being polybutadiene. The preferred elastomeric block copolymers are commercially available as linear tri-block copolymers (A-B-A) from the Shell Chemical Company, Polymers Division, Houston, Tex., under the trade name KRATON and from Dexco Polymers of Houston, Tex., under the family trademark VECTOR. Especially preferred are the linear tri-block copolymers having polystyrene end blocks and a polybutadiene mid-block (S-B-S). Most commercially preferred are oil extended polymers such as KRATON D 2104 having a melt index of about 7 as determined by ASTM Method D 1238, Condition E and VECTOR 7400D, having a melt index of about 8.

The thermoplastic elastomeric films of the present invention may contain from about 20%–70% by weight of the elastomeric block copolymer; preferably from about 45%–65%; especially preferred being from about 50%–65% based on the total weight of polyethylene, and elastomer. The percentages herein are based on the total weight of the elastomeric film composition. As indicated, commercial grades of elastomeric block copolymers can be oil extended and the oil portion is not calculated as part of the percentage herein. To further enumerate the elastomer, linear polyethylene (m-plastomer and/or m-LLDPE) the two parts (polyethylene/elastomer) can be present in a ratio of 1:4–2:1; preferably 1:2–2:1.

The thermoplastic elastomeric films of the present invention may be used in a wide variety of applications where thin, elastic material would be useful. Such films are particularly useful as low cost elastic members for disposable wearing apparel such as diapers, training pants, feminine hygiene devices, medical gowns, gathered laminate garments, non-woven head bands, sports apparel, bandages and protective clothing.

Film Properties

Other final product variables or parameters that are included are discussed below.

The addition of sufficient levels of surfactant to a polyethylene should generally be "property neutral" that is, the surfactant addition should not substantially diminish any important finished product property such as haze, impact resistance, gloss, tear resistance, modulus, and the like.

The surfactant should have a melting point not generally greater than 30° C., preferably 25° C., more preferably 20° C., most preferably 15° C. above the processing temperature of the linear polyethylene. The surfactant is generally and preferably molten at the processing temperature of the polyethylene. The processing temperature will be well understood by those of ordinary skill in the art and will differ by melt fabrication technique, e.g. blown film and blow molding temperatures will vary. Also the melt processing temperature can be characterized by the melt temperature itself rather than the extruder zone temperatures.

Extractability

Extractability of the surfactant from the polyethylene-surfactant matrix should be no more than 7% (wt) of the total surfactant in either water (at 100° C. for 3 hrs.) or 95%/5% ethanol/water (at 55° C. for 4 hrs.), preferably not more than 5% (wt.), more preferably not more than 4% (wt.), all based on not more than 3 wt. % of surfactant in the polyethylene.

EXAMPLES

Example 1

An antioxidant stabilized metallocene catalyzed linear low density polyethylene resin (m-LLDPE), Exceed™ ECD102 of the following nominal properties (a 1 melt index, 0.917 gm/cc density, ethylene 1-hexene copolymer available from Exxon Chemical Co., Houston, Tex., USA), is used in this example.

To the granular m-LLDPE resin (Example 1) is added 0.25 wt % BioTerge® AS-90B Beads (a sodium $C_{14}$–$C_{16}$ alpha olefin sulfonate available from Stepan Co., Northfield, Ill., USA). A control sample (Comparative example C1) is prepared by adding 0.08 wt % Dynamar™ FX-9613 (a fluoroelastomeric processing aid available from 3M Co., St. Paul, Minn., USA) to a separate portion of the granular m-LLDPE resin. Both portions are compounded and pelletized on a Werner Pfleiderer twin screw extruder.

The two pelletized formulations are extruded into film on a 2.5 inch (6.35 cm) Egan tubular blown film extruder. The extruder has a 24/1 length/diameter ratio, Sterlex® barrier LLDPE screw and is equipped with a 6 inch (15.25 cm) diameter annular die with a 0.030 inch (0.076 cm) die gap. The temperature profile used ranged from 325 to 410° F. (162–210° C.). Observed melt temperatures ranged from 432 to 438° F. (222–225° C.). Extruder screw rpm is set to achieve approximately 120 lbs (54.5 kg)/hr of polymer output. Under these conditions, the estimated shear rate is approximately 430 $sec^{-1}$. The extruded film gauge was nominally 0.0015 inch (38 microns) with a layflat of approximately 24 inches (61 cm).

The extrusion sequence for each formulation is as follows. The film line is purged with an LDPE masterbatch containing approximately 4 wt % diatomaceous earth antiblock (A1 product from Exxon Chemical Co., Houston, Tex., USA). Next, a portion of the m-LLDPE resin, to which no BioTerge® AS-90B or Dynamar™ FX-9613 is added, is extruded into film. Samples of the film are inspected to ensure complete melt fracture. Finally, the test formulation is extruded into film. Periodic samples of the film are taken and the portions which display visible melt fracture, characterized by patterns of irregular flow known as sharkskin, are measured in the transverse direction of the film. The % melt fracture is calculated based upon the total layflat width of the film.

The data in Table 1 demonstrates that 0.25 wt % BioTerge® AS-90B used in Example 1 substantially eliminates melt fracture in the m-LLDPE film. The elapsed time for this substantial elimination of melt fracture is nearly the same amount of time needed for 0.08 wt % Dynamar™ FX-9613 (Comparative example C1) to eliminate melt fracture. At the end of each run, the extruder rpm is increased until the motor load limit is reached (93 rpm) and melt fracture-free film is maintained for each formulation (680 sec-1). A sample with neither FX-9613 nor AS-90B never achieves melt fracture free performances.

This is as expected since extrusion shear under these conditions results in a rate above the critical shear rate for this m-LLDPE. In the absence of the surfactant or fluoroelastomer, this will cause melt fracture in the resulting film.

TABLE 1

| | % Melt Fracture | |
|---|---|---|
| Elapsed Time (min) | Example C1 (w/0.08 wt % FX-9613) (%) | Example 1 (w/0.25 wt % AS-90B) (%) |
| 0 | 100 | 100 |
| 5 | 94 | — |
| 10 | 67 | 96 |
| 15 | 7 | 19 |

TABLE 1-continued

| | % Melt Fracture | |
|---|---|---|
| Elapsed Time (min) | Example C1 (w/0.08 wt % FX-9613) (%) | Example 1 (w/0.25 wt % AS-90B) (%) |
| 20 | 1 | 1 |
| 25 | 0 | — |
| 35 | — | 0 |

TABLE 1A

| Example | Output (lb./hr) | AS-90B Conc. (wt %) | FX-9613 Conc. (wt %) | Head Pressure (psig) | Die Pressure (psig) | Motor Load (amps) |
|---|---|---|---|---|---|---|
| 1 | 120 | None | None | 5670. | 4340. | 57.7 |
| 1 | 120 | 0.25% | None | 4794. | 3670. | 45.0 |
| C1 | 115 | None | None | 4945. | 4008. | 54.2 |
| C1 | 115 | None | 0.08% | 3701. | 3098. | 46.8 |

In addition, the extruder head pressure, die pressure and motor load measured during the extrusion of Example 1 was reduced by approximately 15 to 22% when compared to the same m-LLDPE resin without BioTerge® AS-90B. Comparative example C1 showed reductions in the range of 14 to 25% when compared to the same m-LLDPE resin without Dynamar™ FX-9613.

Based upon this example, 0.25 wt % of the BioTerge® AS-90B provides equivalent performance to 0.08 wt % Dynamar® FX-9613 in reduction of melt fracture, head pressure, die pressure and motor load in Exceed® ECD102 m-LLDPE.

Example 2

The m-LLDPE resin used is the same as that of Example 1. The granular m-LLDPE resin is split into two portions. The first portion, which contained no processing aid previously discussed (e.g. BioTerge® AS-90B or FX-9613) and pelletized on a Werner Pfleiderer 57 mm twin screw extruder (Comparative example C2). To the second portion of m-LLDPE is added 0.06 wt % BioTerge® AS-90B beads followed by compounding/pelletization on the same twin screw extruder (Example 2).

The two formulations are extruded into film using the same extruder as in Example 1. The temperature profile used ranged from 325 to 400° F. (162–204° C.). Observed melt temperatures range from 432 to 439° F. (222–226° C.). Extruder screw rpm is held constant at 74 rpm to achieve approximately 140 lbs/hr of polymer output. Under these conditions, the estimated shear rate is approximately 500 sec$^{-1}$. The extrusion sequence is as follows: A1, Comparative example C2, Example 2.

The elimination of melt fracture is measured using the same method as in Example 1. In addition, extruder measurements of head pressure, die pressure and motor load are taken periodically.

The data in Table 2 demonstrates that 0.06 wt % BioTerge® AS-90B used in Example 2 reduces melt fracture in the m-LLDPE film to approximately 1% within an hour and completely eliminates it within 1.5 hours. As expected, the rate of elimination of melt fracture is slower when a lower concentration of BioTerge® AS-90B is used. By contrast, the m-LLDPE resin which contains no BioTerge® AS-90B yielded film which was completely melt fractured. Even at this low concentration, the BioTerge® AS-90B reduced the extruder head pressure, die pressure and motor load by 6–7%. At the end of the run, the extruder rpm was increased until the motor load limit was reached (96 rpm) and the Example 2 formulation maintained melt fracture-free film (630 sec-1).

TABLE 2

| Example | Elapsed Time (min) | AS-90B Conc. (wt %) | Head Pressure (psig) | Die Pressure (psig) | Motor Load (amps) | Melt Fracture (%) |
|---|---|---|---|---|---|---|
| C2 | 94 | 0 | 5709 | 4520 | 57.4 | 100 |
| 2 | 0 | 0.06 | 5771 | 4592 | 57.5 | 100 |
| 2 | 30 | 0.06 | 5601 | 4392 | 55.0 | 18 |
| 2 | 57 | 0.06 | 5462 | 4338 | 54.4 | 1 |
| 2 | 86 | 0.06 | 5314 | 4220 | 53.6 | 0 |

Example 3

The antioxidant stabilized plastomer used in this example was an Exact™ 3128 (a 1.2 melt index, 0.900 gm/cc density, ethylene 1-butene copolymer available from Exxon Chemical Co., Houston, Tex., USA). The pelletized metallocene plastomer resin was split into two portions. The first portion, which contained no processing aid, was tested directly (Comparative example C3). To the second portion of metallocene plastomer was added 0.06 wt % BioTerge® AS-90B beads followed by compounding/pelletization on a Werner Pfleiderer 57 mm twin screw extruder (Example 3).

The two formulations were extruded into film using the same extruder and test sequence as Example 2. The temperature profile used ranged from 300 to 395° F. (149–202° C.). Observed melt temperatures ranged from 413 to 417° F. (212–214° C.). Extruder screw rpm was held constant at 52 rpm to achieve approximately 120 lbs/hr of polymer output. Under these conditions, the estimated shear rate was approximately 430 sec$^{-1}$.

The data in Table 3 demonstrates that 0.06 wt % BioTerge® AS-90B used in Example 3 completely eliminates melt fracture within 33 minutes. By contrast, the metallocene plastomer resin which contained no BioTerge® AS-90B yielded films which was completely melt fractured. The observed reductions in extruder head pressure, die pressure and motor load ranged from 10 to 14%. At the end of the run, the extruder rpm was increased until the motor load limit was reached (64 rpm) and the Example 3 formulation maintained melt fracture-free films (520 sec-1).

TABLE 3

| Example | Elapsed Time (min) | AS-90B Conc. (wt %) | Head Pressure (psig) | Die Pressure (psig) | Motor Load (amps) | Melt Fracture (%) |
|---|---|---|---|---|---|---|
| C3 | 30 | 0 | 6047 | 4555 | 62.3 | 100 |
| C3 | 56 | 0 | 6045 | 4543 | 63.0 | 100 |
| 3 | 0 | 0.06 | 5979 | 4521 | 60.7 | 100 |

TABLE 3-continued

| Example | Elapsed Time (min) | AS-90B Conc. (wt %) | Head Pressure (psig) | Die Pressure (psig) | Motor Load (amps) | Melt Fracture (%) |
|---|---|---|---|---|---|---|
| 3 | 33 | 0.06 | 5503 | 4131 | 57.4 | 0 |
| 3 | 59 | 0.06 | 5225 | 3920 | 55.9 | 0 |

Example 4

An antioxidant stabilized Z-N catalyzed linear low density polyethylene resin (LLDPE), Escorene® LL1001 (a 1.0 melt index, 0.918 gm/cc density, ethylene 1-butene copolymer available from Exxon Chemical Co., Houston, Tex., USA), is used in this example. The granular LLDPE resin is split into two portions. The first portion, which contained no processing aid, is pelletized on a Weiner Pfleider 57 mm twin screw extruder and then tested directly (Comparative example C4). To the second portion of LLDPE was added 0.06 wt % BioTerge® AS-90B beads followed by compounding/pelletization on a Werner Pfleiderer 57 mm twin screw extruder (Example 4).

The two formulations were extruded into film using the same extruder and test sequence as Example 2. The temperature profile used ranged from 233 to 411° F. (112–211° C.). Observed melt temperatures ranged from 434 to 440° F. (223–227° C.). Extruder screw rpm was held constant at 69 rpm to achieve approximately 147 lbs/hr of polymer output. Under these conditions, the estimated shear rate was approximately 525 sec$^{-1}$.

The data in Table 4 demonstrates that 0.06 wt % BioTerge® AS-90B used in Example 4 reduced melt fracture in the LLDPE film to approximately 24% within an hour. By contrast, the LLDPE resin which contained no BioTerge® AS-90B yielded film which was completely melt fractured. The observed reductions in extruder head pressure, die pressure and motor load ranged from 8 to 15%. Melt fracture was completely eliminated after 155 minutes. At the end of the run, the extruder rpm was increased up to the limit of bubble stability (105 rpm) and the Example 4 formulation maintained melt fracture-free film (700 sec-1).

TABLE 4

| Example | Elapsed Time (min) | AS-90BB Conc. (wt %) | Head Pressure (psig) | Die Pressure (psig) | Motor Load (amps) | Melt Fracture (%) |
|---|---|---|---|---|---|---|
| C4 | 39 | 0 | 4877 | 3724 | 48.9 | 100 |
| 4 | 0 | 0.06 | 4733 | 3597 | 45.3 | 100 |
| 4 | 41 | 0.06 | 4451 | 3471 | 41.8 | 45 |
| 4 | 56 | 0.06 | 4419 | 3423 | 41.7 | 24 |

Example 5

An antioxidant stabilized metallocene catalyst produced plastomer, Exacts 4049 (a 4.5 melt index, 0.873 g/cc density, ethylene butene copolymer produced by Exxon Chemical Co., Houston, Tex., USA) is used in this example. A pelletized form of the copolymer is introduced into a Brabender Plasti-corder melt mixer which was heated to 193° C. Typically, 50–60 g of material is introduced at a rotation speed of 40 RPM. Upon complete melting, the torque remains essentially invariant with time and is used as the base value. Subsequently, a measured amount of sodium alpha olefin sulfonate (Bio Terge® AS-90B beads—product of Stepan Co., Northfield, Ill., USA) is added. The torque is again measured at 40 RPM and compared with the base torque value. In this particular example, a torque reduction (12%) is observed at 0.5 wt % of the Bio Terge® AS-90B beads. At higher levels of the Bio Terge® AS-90B beads, further reductions are noted. For example, at a 3.0 wt % addition, the torque is reduced by >35%. To insure that complete mixing has occurred, the rotation speed is increased to 100 RPM for five minutes. The material is dumped from the Brabender, cut into small pieces, and allowed to cool to room temperature.

The material is formed in sheets via conventional compression molding techniques (PHI Co.). 2"×2"×0.02" pads are formed using the following conditions: 2 minute preheat at 193° C., followed by a 3 minute press cycle at 29 tons (193° C.) and finally a 4 minute cooling to room temperature again at 29 tons pressure.

The tensile properties of all materials are measured on a computer controlled Instron tensile tester (Model 5565). In most instances, little to moderate improvement in tensile properties are measured.

The films containing Bio Terge® AS-90B beads are optically clear and homogeneous.

Example 6

Following the mixing procedure of Example 5 using again the Exact® 4049 copolymer, a 3.0 wt % of a calcium alpha olefin sulfonate material (product of Stepan Co., Northfield, Ill., USA) was introduced into the copolymer melt. In this particular instance, the torque was not reduced. Expanding the range of the calcium-based material from 1.0 to 5.0 wt %, again showed no reduction in torque.

Compression-molded pads were produced (as in example 5). An examination of the films showed that the calcium alpha olefin sulfonate was not mixed and, in fact, a large number of specks, i.e. heterogeneous regions, were observed, illustrating poor dispersion and mixing.

Example 7

Example 5 is repeated using an antioxidant stabilized metallocene catalyst synthesized plastomer, Exact® 3033 (a 1.2 melt index, 0.900 g/cc density, ethylene butene hexene terpolymer produced by Exxon Chemical Co., Houston, Tex., USA). Two concentrations (0.5 and 3.0 wt %) of the Bio Terge® AS-90B beads are evaluated. The lower and higher concentrations produced a torque reduction of 28 and >35%, respectively.

The compression-molded films were optically clear and homogeneous, indicating excellent dispersion and mixing.

Example 8

Example 7 is repeated substituting the sodium alpha olefin sulfonate with 3.0 wt % calcium alpha olefin sulfonate. No torque reduction is measured. The compression-molded films are heterogeneous with a large number of specks randomly distributed throughout the film, illustrating poor dispersion and mixing.

Example 9

Example 5 is repeated using an antioxidant stabilized metallocene catalyst produced plastomer, Exact® 3028 (a 1.2 melt index, 0.900 g/cc density, ethylene butene copolymer produced by Exxon Chemical Co., Houston, Tex., USA. Three concentrations (0.5, 1.0 and 3.0 wt %) of the Bio Terge® AS-90B beads are evaluated. The data in Table 5 demonstrates that as the concentration is increased the torque is reduced.

TABLE 5

| Sodium Alpha Olefin Sulfonate (wt %) | Torque Reduction (%) |
| --- | --- |
| 0.5 | 21 |
| 1.0 | 27 |
| 3.0 | 35 |

Example 10

Example 5 is repeated using an antioxidant stabilized metallocene catalyst produced plastomer, Exact® 3025 (a 1.2 melt index, 0.910 g/cc density, ethylene butene copolymer produced by Exxon Chemical Co., Houston, Tex., USA). Two concentrations (0.5 and 3.0 wt %) of the Bio Terge® AS-90B beads are evaluated.

The date in Table 6 demonstrates that as the concentration is increased the torque is reduced.

TABLE 6

| Sodium Alpha Olefin Sulfonate (wt %) | Torque Reduction (%) |
| --- | --- |
| 0.5 | 25 |
| 3.0 | 30 |

Example 11

Example 5 is repeated using a physical mixture of antioxidant stabilized metallocene catalyst produced plastomers. In this example, the Exact® 4049 copolymer and Exact® 3033 terpolymer are melt mixed in a 93:8 wt ratio and subsequently, 0.5 wt % of the Bio Terge® AS-90B beads were added. A 12% torque reduction is measured.

Example 12

Example 5 procedure is repeated using Exact® 4049 and Exact® 3033 materials with a wide range of fluorocarbon-based materials (Fluorad Fluorochemical Surfactants produced by 3M, St. Paul, Minn., USA). All materials used were free of solvent(s) using conventional drying procedures prior to melt mixing. The data in Table 7 describes the products used in this example as well as their chemical structures and the measured torque reductions at 193° C. at a 0.5 wt % concentration. The data demonstrates that no torque reductions are observed for both the potassium and ammonium perfluoroalkyl sulfonates. However, a range of torque reductions are observed which is dependent on the specific fluorocarbon structure.

TABLE 7

| | Fluorocarbon-Based Materials | | | |
| --- | --- | --- | --- | --- |
| 3M Product Number | Type | Description | Torque Reduction-Exact ® 4049 (%) | Torque Reduction-Exact ® 3033 (%) |
| FC-93 | Anionic | Ammonium perfluoroalkyl sulfonates | 0 | 0 |
| FC-95 and FC-98 | Anionic | Potassium perfluoroalkyl sulfonates. | 0 0 | 0 0 |
| FC-99 | Anionic | Amine perfluoroalkyl sulfonates | 35 | 35 |
| FC-100 | Amphoteric | Fluorinated alkyl amphoteric mixture | 6 | 6 |
| FC-120 | Anionic | Ammonium perfluoroalkyl sulfonates | 0 | 25 |
| FC-129 | Anionic | Potassium fluorinated alkyl carboxylates | 7 | 7 |
| FC-135 | Cationic | Fluorinated alkyl quaternary ammonium iodides | 17 | 58 |
| FC-143 | Anionic | Ammonium perfluoralkyl carboxylates | 17 | 34 |
| FC-431 | Nonionic | Fluorinated alkyl esters | 37 | 30 |
| FC-740 | Nonionic | Fluorinated alkyl esters | 12 | 8 |

Example 13

Example 5 procedure is repeated using sodium and calcium dodecylbenzene sulfonate materials. The former material is a product of the Witco Corp., Houston, Tex., USA and the latter material is a product of Stepan Co., Northfield, Ill., USA. The data in Table 8 shows that the calcium-based material provides no reduction in the torque, while the sodium-based material provides only a relatively modest reduction (or no enhancement).

TABLE 8

| Dodecylbenzene Sulfonate | Product Designation | Concentration (%) | Torque Reduction (%) |
|---|---|---|---|
| Sodium | Witconate 90 | 3.0 | 11 |
| Sodium | Witconate LX | 3.0 | 6 |
| Sodium | Witconate SK | 3.0 | 0 |
| Calcium | Experimental Product | 1.0 | 0 |
| Calcium | Experimental Product | 3.0 | 0 |
| Calcium | Experimental Product | 5.0 | 0 |

Examples 14–18

Table 9 shows the description of samples used in these examples and summarizes the process data. Examples 14 and 17 are the comparative control samples. Al materials were fabricated on a ¾" Haake Rheocord extruder, Model E in the cast mode. The screw was a 15/5/5, 24:1 L/D with 15° tip. The polymer was extruded through a 4" tape die and wound through a stacked calendar assembly to the winder. Al polymers were preblended and compounded on a 1" MPM single screw (24:1 L/D) compounding extruder at a melt temperature of ~190° C. prior to film extrusion. Each example contained 25,000–30,000 ppm silica antiblock and ~2000 ppm erucamide slip. All materials were cast extruded through a 20 mil die gap at ~190° C. melt. Materials used consisted of Exact 4049 (4.5 MI; 0.873 density ethylene-butene copolymer), a metallocene plastomer produced by Exxon Chemical Co., Houston, Tex., USA, Vector 7400 D, an 8.0 MI/0.930 density SBS (31/69/SB ratio) produced by Dexco Co., Houston, Tex. USA; and 3.0 wt % of a sodium alpha olefin sulfonate (Bio-Terge® AS-90B beads produced by Stepan Co., Northfield, Ill., USA as in example 1); and 3.0 wt % of calcium alpha olefin sulfonate, also produced by Stepan Co.

As can be seen, the sodium alpha olefin sulfonate drastically reduces the torque requirements when comparing samples 14 and 15 (>2X). This same trend was also evident when comparing samples 17 and 18, the Exact®/SBS blends. In all four cases, the film exhibited good melt quality and homogenization. This was not the case when comparing sample 16 (calcium alpha olefin sulfonate). The film quality was very poor with numerous unmelted gels, even after raising the melt temperature from 190–240° C. It also did not compare with the sodium alpha olefin sulfonate concerning torque reductions.

Table 10 summarizes the test results for examples 14–18. Tensile testing was performed according to ASTM D-882 on a United Six Station tensile tester, model 7V1. Tear results were obtained from an Elmendorf tear tester according to ASTM D-1922.

The hysteresis testing procedure used is described as follows. This method is an Exxon variation of a procedure described by E.I., DuPont and Co. in its brochure on its polyester urethane elastic product, T-722A. In the variation used herein, 1 inch×6 inch strips are subjected to a strain rate of 150% or 200% with a jaw gap separation of 2" and cross head speed of 20"/min. The hysteresis stress/strain curve is plotted on a chart also traveling at 20"/minute. Both the extension and retraction cross head speeds (20"/min) were the same and performed on an Instron model 1123. The film was held for 60 seconds at maximum extension and then retracted and held for 30 seconds relaxation prior to the next cycle. This was repeated 2½ times. Key pieces of information that are extracted from these stress/strain plots are the maximum force (modulus) of each cycle, the residual set or permanent set (the degree of deformation as measured by the point of stress divided by total strain/cycle), and the unload force of contractive power as measured from the last retraction cycle at various elongations. Generally, five specimens were tested for each sample, with mean values over these samples developed.

As can be seen, there are substantially no detrimental effect(s) to physical properties with the addition of surfactants. In fact, there appears to be slight improvement to the elastic properties as compared to the control comparisons (example 14 and 17).

TABLE 9

Process Summary

| Example(1) | 14 | 15 | 16(2) | 17 | 18 |
|---|---|---|---|---|---|
| Formulation | | | | | |
| Exact 4049 | 100 | 97 | 97 | 30 | 27 |
| Vector 7400D | | | | 70 | 70 |
| Na α-olefin Sulfonate | | 03 | | | 03 |
| Ca α-olefin Sulfonate | | | 03 | | |
| Extruder RPM | 32 | 32 | 32 | 32 | 32 |
| Ext. HdPSI | 650 | 620 | 560 | 730 | 580 |
| Die PSI | 100 | 100 | 100 | 100 | 100 |
| Ext. Torque (M–G) | 2600 | 1200 | 2100 | 2300 | 700 |
| Ext. Melt (° C.) | 191 | 193 | 231 | 191 | 193 |
| Gauge (mils) | 2.0 | 1.9 | 2.3 | 2.6 | 3.6 |
| Line Speed (fpm) | 17 | 17 | 17 | 15 | 12 |

(1) % excludes slip and AB addition via masterbatch
(2) Poor extrusion, melt quality. Numerous-unmelted particles.

TABLE 10

MD Property Summary[1]

| Test | 14 | 15 | 16 | 17 | 18 |
|---|---|---|---|---|---|
| Formulation | | | | | |
| Exact 4049 | 100 | 97 | 97 | 30 | 27 |
| Vector | | | | 70 | 70 |
| Na α-olefin Sulfonate | | 03 | | | 03 |
| Ca α-olefin Sulfonate | | | 03 | | |
| Tensiles | | | | | |
| Yld (PSI) | 287 | 287 | 233 | 165 | 160 |
| Yld Elong (%) | 11.8 | 11.8 | 11.5 | 6.6 | 6.4 |
| Ult. Tns (PSI) | 2780 | 3260 | 2740 | 1900 | 1520 |
| Brk Elong (%) | 630 | 670 | 730 | 630 | 660 |
| Tear(g/mil) | 34.7 | 33.3 | 23.2 | 19.1 | 26.3 |
| Hysteresis (150% ext) | | | | | |
| % Set | 23.9 | 21.8 | 20.0 | 9.8 | 7.3 |
| Modulus 1 (g) | 560 | 500 | 460 | 405 | 510 |
| Modulus 2 (g) | 500 | 440 | 410 | 350 | 450 |
| Unload at 50% (g) | 6 | 10 | 19 | 110 | 150 |
| Unload at 100% (g) | 140 | 130 | 130 | 195 | 260 |

[1]MD = Machine Direction

Examples 19–26

Table 11 shows the description of samples used in these examples and summarizes the process data at both standard rates and maximum rates. Examples 19–22 are the control comparatives. Those samples describe a new grade under development by Exxon Chemical Co., of Houston, Tex., USA referred to as APT-3. This is an advanced performance terpolymer having an MI of 2.2 and density of 0.898. Exact 4151 (2.2 MI, 0.896 density, metallocene ethylene, butene copolymer) is the precursor grade. Advanced Performance Terpolymers are characterized as having improved processability vs. their precursor counterpart in the blown film process, i.e. lower motor load and torque requirements and improved bubble stability attributes. In these embodiments of the present invention, surfactant addition in the amount of 0.05, 0.1, 0.25 and 0.5 weight percents are added to APT-3 and compared to the control (APT-3) and base precursor grade (Exact 4151) with and without slip/antiblock addition. The slip used was Kemamide E erucamide (produced by Witco, Inc., Memphis, Tenn.), the antiblock (AB) was ABT-2500 Talc (produced by Specialty Minerals, Los Angeles, Calif.) and the fluoroelastomeric process aid (PPA) used in some of the formulations was Viton A (produced by E.I. Dupont, Wilmington, Del.). The surfactant used is a sodium alpha olefin sulfonate (Bio-Terge® AS-90B produced by Stepan Co., Northfield, Ill. USA as in example 1). Prior to film extrusion, all materials were compounded on a Werner and Pfleiderer ZSK-57 mm twin screw extruder at a melt temperature between 410–420° F. (210–216° C.). The materials were then fabricated into films on a 2.5" Egan blown film line. This is a 24:1 L/D extruder powered by a 40 HP DC drive. Maximum screw RPM's is 115, thus capable of producing a maximum torque of 0.35 HP/Rev. The barrel is liquid cooled and consists of 3 temperature zones and 5 pressure ports. The screw is a 24:1 L/D Sterlex low work barrier screw having a 0.050" barrier undercut with a Maddock mixing device at the end of the screw also having a 0.050" undercut. The die is a 6" Uniflo lower pressure bottom fed spiral mandrel die with a 60 mil die gap. The air ring is a 6" dual lip Uniflo design. Screenpack=20/40/80/20. Blow up Ratio (BUR)=2.5. Temperature profile was as follows:

| Brl Z1 | Brl Z2 | Brl Z3 | Dies/Adapters |
|---|---|---|---|
| 280° F. (138° C.) | 375° F. (191° C.) | 345° F. (174° C.) | 365° F.→ (185° C.) |

Each material was extruded at standard rates (~7 lbs/in die/hr) and maximum rates with all pertinent process data recorded on a data logger. Each material was run until lined out as demonstrated via data logger (~1 hr/sample).

The maximum rate was defined as either the point of bubble instability (BS) motor load (ML) or maximum RPM's (RPM). Bubble instability criteria used was as follows:

bubble fluttering gauge>±10% edge wrinkles after adjustments to the collapsing frame.

If any of these criteria was met, the rate was backed off until a stable condition could be maintained as indicated by the data logger (steady state).

As can be seen, surfactant addition has little to no effect on process at low rates. The real effect occurs between 0.25–0.50 weight percent levels. At 0.5 weight percent level there is an ~20% reduction in motor load compared to APT-3 and ~30% reduction when compared to the precursor material. Effects on torque also follow this trend with an ~30 and ~40% reduction, respectively. Low level surfactant (0.05–0.1 weight %) improves rate production slightly. Between 0.25–0.5 weight %, the rate is increased substantially due to the reduced motor load and lower melt. At 0.5 weight % level, rate production was increased by >25% compared to APT-3 w/o surfactant and >45% when compared to the precursor.

No pumping efficiency (lbs/RPM) is lost between 0.05–0.25 weight %. Between 0.25–0.5 weight % there is a drop off, but this is of little consequence if there is available extruder RPM.

Surfactant addition to Exxpol® metallocene grades and APT grades can have a substantial effect on processability especially in monolayer blown film production where motor load and torque requirements can be limiting factors. These advantages are also seen in conventional Z-N catalyzed LLDPE production.

Table 12 summarizes physical property test results and as can be seen, no detrimental effects can be attributed to the addition of surfactant. All tests were performed according to the appropriate ASTM standard method.

Table 13 illustrates no adverse surface sealing effects can be attributed to the addition of surfactant. Hot tack comparisons of Exact 4151, APT-3 w/o surfactant and APT-3 w/surfactant are virtually identical as demonstrated.

In addition, organoleptic testing by a certified odor and taste facility show no adverse effects for food packaging applications.

TABLE 11

Exact 4151 vs. APT-3 With and Without Surfactant

| Example | 19 | 20 | 21 | 22 | 23 | 24 | 25 | 26 |
|---|---|---|---|---|---|---|---|---|
| Grade | 4151 | 4151A | APT-3 | APT-3A | APT-3B | APT-3C | APT-3D | APT-3E |
| Slip (ppm) | — | 1000 | — | 1000 | 1000 | 1000 | 1000 | — |
| A/B (ppm) | — | 4000 | — | 4000 | 4000 | 4000 | 4000 | — |
| PPA (ppm) | Coat | 600 | — | — | — | — | — | — |
| Surfactant (%) | — | — | — | — | 0.05 | .1 | .25 | .5 |
| MI (dg/min) | 2.19 | 2.17 | 2.18 | 2.23 | — | — | — | 2.22 |

TABLE 11-continued

Exact 4151 vs. APT-3 With and Without Surfactant

| Example | 19 | 20 | 21 | 22 | 23 | 24 | 25 | 26 |
|---|---|---|---|---|---|---|---|---|
| Grade | 4151 | 4151A | APT-3 | APT-3A | APT-3B | APT-3C | APT-3D | APT-3E |
| Density (g/cc) | 0.8966 | 0.8976 | 0.8987 | 0.9009 | — | — | — | 0.8996 |
| Standard Process Conditions: (~7 lbs/in-die) | | | | | | | | |
| RPM's | 48.4 | 48.3 | 50.4 | 48.5 | 48.1 | 48.4 | 48.4 | 69.2 |
| Load (amps) | 52.3 | 51.8 | 49.0 | 49.1 | 49.4 | 49.1 | 47.8 | 40.0 |
| HdPSI | 2900 | 2820 | 2630 | 2760 | 2790 | 2760 | 2855 | 2660 |
| Melt (° F.) | 381 | 378 | 377 | 377 | 377 | 378 | 375 | 374 |
| HP | 15.24 | 15.23 | 14.9 | 14.31 | 14.27 | 14.31 | 13.9 | 16.2 |
| Torque | 0.32 | 0.32 | 0.29 | 0.295 | 0.29 | 0.29 | 0.288 | 0.23 |
| (HP/RPM) | 8.76 | 9.05 | 9.01 | 9.33 | 9.34 | 9.35 | 9.73 | 8.33 |
| Eff (lbs/HP-hr) | 134 | 134 | 134 | 134 | 133 | 134 | 135 | 135 |
| lbs/hr | 2.76 | 2.77 | 2.66 | 2.75 | 2.77 | 2.76 | 2.80 | 1.96 |
| lbs/hr/RPM | 7.09 | 7.09 | 7.13 | 7.10 | 7.08 | 7.10 | 7.18 | 7.18 |
| lbs/in-die | 1.5 | 1.5 | 1.5 | 1.5 | 1.5 | 1.5 | 1.5 | 1.5 |
| Gauge (mil) | | | | | | | | |
| Extrusion Performance at Max Rates | | | | | | | | |
| RPM's | 59.6 | 64.3 | 71.0 | 71.7 | 74.6 | 75.9 | 82.6 | 120.5 |
| Load (amps) | 58.5 | (1) | 59.4 | 59.8 | 60.0 | 60.2 | 60.2 | 55.5 |
| HdPSI | 3220 | 57.3 | 3100 | 3330 | 3410 | 3440 | 3620 | 3710 |
|  |  | 3190 |  |  |  |  |  |  |
| Melt (° F.) | 387 |  | 389 | 388 | 391 | 391 | 390 | 388 |
| HP | 20.13 | 389 | 23.8 | 24.1 | 24.97 | 25.44 | 27.43 | 36.1 |
| Torque | 0.34 | 21.1 | 0.33 | 0.33 | 0.33 | 0.33 | 0.33 | 0.30 |
| (HP/RPM) | 8.03 | 0.34 | 7.92 | 8.10 | 8.11 | 8.04 | 8.09 | 6.93 |
| Eff. lbs/HP-hr) | 162 | 8.30 | 188 | 195.6 | 203 | 205 | 222 | >250 |
| lbs/hr | 2.71 | 171 | 2.65 | 2.72 | 2.72 | 2.70 | 2.69 | 2.07 |
| lbs/hr/RPM | 8.58 | 2.66 | >10.0 | >10.2 | >10.8 | >10.86 | >11.78 | >13.3 |
| lbs/in-die | BS | 9.10 | ML | ML | ML | ML | ML | RPM |
| Rate limit | 1.5 | BS | 1.5 | 1.5 | 1.5 | 1.5 | 1.5 | 1.5 |
| Gauge (mil) |  | 1.5 |  |  |  |  |  |  |

TABLE 12

Property Results

| Example | 19 | 20 | 21 | 22 | 23 | 24 | 25 | 26 |
|---|---|---|---|---|---|---|---|---|
| Grade | 4151 | 4151A | APT-3 | APT-3A | APT-3B | APT-3C | APT-3D | APT-3E |
| Slip (ppm) | — | 1000 | — | 1000 | 1000 | 1000 | 1000 | — |
| A/B (ppm) | — | 4000 | — | 4000 | 4000 | 4000 | 4000 | — |
| PPA (ppm) | Coat | 600 | — | — | — | — | — | — |
| Surfactant (%) | — | — | — | — | 0.05 | .1 | .25 | .5 |
| MI | 2.19 | 2.17 | 2.18 | 2.23 | — | — | — | 2.22 |
| Density | 0.8966 | 0.8976 | 0.8987 | 0.9009 | — | — | — | 0.8996 |
| Gauge (mils) | 1.31 | 1.55 | 1.30 | 1.51 | 1.50 | 1.49 | 1.47 | 1.21 |
| Tensiles Ult (psi) | | | | | | | | |
| MD | 9300 | 10,000 | 10,240 | 9,580 | 9,250 | 8,770 | — | 9,670 |
| TD | 9700 | 8,650 | 10,330 | 8,860 | 8,530 | 8,310 | — | 9,980 |
| Break (%) | | | | | | | | |
| MD | 500 | 550 | 550 | 540 | 560 | 560 | — | 520 |
| TD | 570 | 570 | 600 | 590 | 590 | 590 | — | 590 |
| Tear (g/mil) | | | | | | | | |
| MD | 200 | 205 | 190 | 185 | 180 | 180 | — | 160 |
| TD | 230 | 230 | 250 | 245 | 235 | 230 | — | 260 |
| 1% Sec. Mod (psi) | | | | | | | | |
| MD | 8,400 | 9,300 | 10,500 | 10,200 | 10,400 | 10,100 | — | 10,100 |
| TD | 8,600 | 10,800 | 10,200 | 10,700 | 9,500 | 9,940 | — | 10,100 |
| Dart (g/mil) | | | | | | | | |
| Method B (60#) Puncture | 450 | — | 450 | 440 | — | — | — | 470 |
| Force (lbs) | 9.2 | 8.4 | 10.1 | 8.0 | 8.1 | 7.7 | — | 8.7 |
| Brk Erg (in-lbs) | 30.8 | 22.3 | 35.7 | 22.0 | 20.7 | 20.7 | — | 30.0 |

TABLE 12-continued

| | Property Results | | | | | | | |
|---|---|---|---|---|---|---|---|---|
| Example | 19 | 20 | 21 | 22 | 23 | 24 | 25 | 26 |
| Grade | 4151 | 4151A | APT-3 | APT-3A | APT-3B | APT-3C | APT-3D | APT-3E |
| Optics | | | | | | | | |
| Haze | 2.8 | 5.9 | 1.1 | 3.7 | — | 4.3 | — | 1.2 |
| Gloss | 81.7 | 84.7 | 91.5 | 83.7 | — | 83.4 | — | 90.8 |
| OTR (cc/100 in²/day/mil) | 1270 | 1070 | 1330 | 1060 | 1050 | 990 | 1050 | 1230 |
| WVTR (g/100 in²/day/mil) | 2.68 | 2.4 | 2.46 | 2.23 | 2.42 | 2.36 | — | — |

TABLE 13

SEAL PRESS. - 0.5 NEWTON/15 MM   PEEL SPEED - 200 MM/SEC
SEAL TIME - 0.5 SEC                              DEALY TIME - 0.4 SEC

TACK STRENGTH (N/15 mm)

| TEMPERATURE, DEG C -> | 65 | 70 | 75 | 80 | 85 | 90 | 95 | 100 | 110 | 120 | 140 |
|---|---|---|---|---|---|---|---|---|---|---|---|
| Example 19 | 0.12 | 0.47 | 1.39 | 4.25 | 8.47 | 8.62 | 7.54 | 6.35 | 6.14 | 4.14 | 1.74 |
| Example 21 | 0.25 | 0.61 | 1.26 | 2.96 | 8.7 | 8.73 | 7.37 | 6.86 | 5.83 | 4.22 | 1.77 |
| Example 26 | 0.22 | 0.44 | 1 | 3.27 | 8.17 | 7.99 | 7.78 | 7.05 | 5.56 | 3.97 | 1.71 |

| SAMPLE I.D. | EXACT GRADE | AS90 (BIOTERGE) |
|---|---|---|
| Example 19 | EXACT - 4051 | 0 |
| Example 21 | APT-3 | 0 |
| Example 26 | APT-3 | 0.50% |

We claim:

1. A method for processing a linear polyethylene into a film comprising:
   a) selecting a linear polyethylene from the group consisting of linear low density polyethylene (LLDPE), metallocene linear low density polyethylene (m-LLDPE), high density polyethylene (HDPE), plastomers, medium density polyethylene (MDPE), ultra high molecular weight-high density polyethylene (UHMW-HDPE) and combinations thereof,
   b) adding an elastomer from the group consisting of styrene-isoprene-styrene (SIS), styrene-butadiene-styrene (SBS), styrene-ethylene butadiene-styrene (SEBS), styrene-ethylene propylene styrene (SEPS), and combinations thereof to the linear polyethylene of a);
   c) selecting a surfactant, wherein said surfactant is an aliphatic sulfonate salt or branched or straight chain hydroxyl substituted non-aromatic alkyl sulfonate salt, wherein a cation of said salt is selected from the group consisting of Na, K, and Li; wherein said aliphate is a $C_6$–$C_{30}$ branched or straight chain alkenyl, and combinations thereof,
   d) placing an amount of said surfactant into said polyethylene and elastomer sufficient to reduce melt fracture; and
   e) melt processing said polyethylene, elastomer and said surfactant to form said film.

2. The method of claim 1 wherein said linear polyethylene has a $M_w/M_n$ less than 3.

3. The method of claim 2 wherein said linear polyethylene is selected from the group consisting of copolymers of ethylene and at least one α-olefin selected from the group consisting of 1-butene, 1-pentene, 4-methyl-1-pentene, 1-hexene, 1-octene, 1-decene, and combinations thereof.

4. The method of claim 2 wherein said linear polyethylene is selected from the ethylene copolymer group consisting of ethylene 1-butene, ethylene 1-pentene, ethylene 4-methyl-1-pentene, ethylene 1-hexene, and ethylene 1-octene; wherein said linear polyethylene has a density in the range of from 0.86–0.94 g/cc.

5. The method of claim 4 wherein said surfactant is present up to 0.5 wt %, based on the total weight of said polyethylene, elastomer and said surfactant, wherein said elastomer is present in said polyethylene/elastomer at from 45–65 weight percent based on the total weight of said polyethylene/elastomer, and wherein said linear polyethylene has a density from 0.88–0.930 g/cc.

6. The method of claim 1 wherein said linear polyethylene includes at least a second polymer selected from the group consisting of low density polyethylene (LDPE), ethylene vinyl acetate (EVA), ethylene ethyl acrylate (EEA), ethylene normal butyl acrylate (EnBA ), ethylene methacrylic acid (EMAA), ethylene methyl acrylate (EMA), ethylene acrylic acid (EAA) and ionomers of the acids, and combinations thereof.

7. The method of claim 1 wherein said film is a blown film substantially free of melt fracture said linear polyethylene is a copolymer selected from the group consisting of ethylene 1-butene, ethylene 4-methyl-1-pentene, ethylene 1-pentene, ethylene 1-hexene, and ethylene 1-octene.

8. The method of claim 1 wherein said film is a blown film substantially free of melt fracture, said linear polyethylene is a copolymer selected from the group consisting of ethylene 1-butene, ethylene 4-methyl-1-pentene, ethylene 1-pentene, ethylene 1-hexene, and ethylene 1-octene and combinations thereof;

wherein said surfactant is an aliphatic sodium sulfonate or branched or straight chain hydroxyl substituted alkyl sodium sulfonate, wherein said aliphate group is a $C_6$–$C_{30}$ branched or straight chain alkenyl, and combinations thereof and wherein said surfactant is present in said blown film up to about 0.5 weight percent based on the total weight of said polyethylene and said elastomer.

9. The method of claim 8 wherein said surfactant is a sodium α-olefin sulfonate, wherein said α-olefin has 12 to 18 carbon atoms, and said surfactant is present in said blown film up to 0.35 weight percent, based on the total weight of said polyethylene and said elastomer.

10. A method of improving processing of linear polyethylene elastomer blends comprising:
    a) selecting a linear polyethylene from group consisting of linear low density polyethylene (LLDPE), metallocene linear low density polyethylene (m-LLDPE), high density polyethylene (HDPE), ultra high molecular weight-high density polyethylene (UHMW-HDPE), medium density polyethylene (MDPE), plastomers, and combinations thereof;
    b) selecting a surfactant from the group consisting of an alkali metal aliphatic sulfonate surfactant or a branched or straight chain hydroxyl substituted alkalai metal sulfonate surfactant, wherein said aliphate is selected from the group consisting of branched or straight chain alkenyl, and combinations thereof;
    c) adding an elastomer to said polyethylene, said elastomer being selected from the group consisting of styrene-isoprene-styrene (SIS), styrene-butadiene-styrene (SBS), styrene-ethylene butadiene-styrene (SEBS), styrene-ethylene, propylene styrene (SEPS), and combinations thereof;
    d) melt processing said linear polyolefin elastomer blend and said surfactant into film;
    wherein said surfactant is present in said linear polyethylene up to 0.5 weight percent based on the total weight of said linear polyethylene and said elastomer;
    wherein said improvement in processing reduces or eliminates processing problems by reducing or eliminating said problems selected from the group consisting of melt fracture, increased motor load, increased torque, increased head pressure, and combinations thereof.

11. A method of improving processing of linear polyethylene elastomer blends to make a film comprising:
    a) selecting a linear polyethylene from group consisting of linear low density polyethylene (LLDPE), metallocene linear low density polyethylene (m-LLDPE), high density polyethylene (HDPE), ultra high molecular weight-high density polyethylene (UHMW-HDPE), medium density polyethylene (MDPE), very low density polyethylene (VLDPE), plastomers;
    b) selecting an elastomer from the group consisting of styrene-isoprene-styrene (SIS), styrene-butadiene-styrene (SBS), styrene-ethylene butadiene-styrene (SEBS), styrene-ethylene propylene styrene (SEPS), and combinations thereof,
    c) selecting an aliphatic sulfonic acid alkali metal salt substantially free of halogens, or selecting a branched or straight chain hydroxyl substituted alkyl sulfonic acid alkali metal salt wherein said metal salt is present in said linear polyethylene elastomer blend up to 1 weight percent and said elastomer is present from 50–65 weight percent, based on the total weight of said linear polyethylene and elastomer, wherein said aliphatic group is selected from the group consisting of branched or straight chain alkenyl, and combinations thereof, and
    d) melt processing into film said linear polyolefin, elastomer, and said salt;
    wherein said improvement in processing reduces or eliminates processing problems by reducing or eliminating said problems selected from the group consisting of melt fracture, increased motor load, increased torque, increased head pressure, and combinations thereof.

12. A narrow molecular weight distribution polyethylene/elastomer blend comprising:
    a) a polyethylene having an $M_w/M_n$ not exceeding 3;
    b) an aliphatic alkali metal sulfonate or a branched or straight chain hydroxyl substituted alkyl alkali metal sulfonate wherein said aliphatic group has 6–30 carbon atoms and is selected from the group consisting of branched or straight chain alkenyl, and combinations thereof; and
    c) a styrene-butadiene-styrene copolymer having a styrene content from 8–55% by weight of the copolymer,
    wherein said sulfonate is present in said polyethylene in the range of 0.005–1 weight percent, and said elastomer is present in the range of 50–65 weight percent, based on the total weight of said polyethylene and said elastomer.

13. The polyethylene elastomer blend of claim 12, wherein said polyethylene has a $M_w/M_n$ not exceeding 2.5, said alkyl group has 8–24 carbon atoms and said sulfonate is present in said polyethylene in the range of 0.01–0.5 weight percent based on the total weight of said polyethylene and said elastomer.

14. The polyethylene elastomer blend of claim 12, wherein said polyethylene has a $M_w/M_n$ not exceeding 2.5, said aliphatic group has 12–18 carbon atoms and said sulfonate is present in said polyethylene in the range of 0.03–0.35 based on the total weight of said polyethylene and said elastomer.

15. A method of improving melt processing of linear polyethylene/elastomer blends comprising:
    a) combining a linear polyethylene, an elastomer and a surfactant, wherein said surfactant is represented by the formula:

where
        $M_1$ is selected from the group consisting of:
            Li Na, and K,
        $R_1$ is selected from the group consisting of:
            branched or straight chain mono or di unsaturated alkenyl,
            branched or straight chain hydroxyl substituted alkyl and combinations thereof; and
    wherein the carbon number of said $R_1$, ranges from 6 to 30;
    wherein said surfactant is present in said combination in a range of 0.005–1.0 weight percent, based on the total weight of the combination;

b) forming a film from said blends;

wherein said improvement in processing reduces or eliminates processing problems by reducing or eliminating said problems selected from the group consisting of melt fracture, increased motor load, increased torque, increased head pressure, and combinations thereof.

16. A method of improving melt processing of narrow molecular weight distribution polyethylene/elastomer blends comprising:

combining, (a) a polyethylene having a density in the range of 0.860 to 0.970 g/cm$^3$, and a $M_w/M_n$ less than 3; and (b) at least one surfactant represented by the formulae:

$$[R_1SO_3]M_1$$

where
$M_1$ is selected from the group consisting of:
Li, Na, and K,
$R_1$ is selected from the group consisting of:
branched or straight chain mono or di unsaturated alkenyl,
branched or straight chain hydroxyl substituted alkyl, and combinations thereof; and
wherein the carbon number of said $R_1$, ranges from 6 to 30; and (c) a styrene-butadiene styrene copolymer having a styrene content of from 8–55% by weight of the copolymer;

wherein said surfactant is present in said polyethylene/elastomer blend in a range of 0.005 to 1.0 weight percent, based on the total weight of said polyethylene/elastomer blend; and forming a film from said blends;

wherein said improvement in processing reduces or eliminates processing problems by reducing or eliminating said problems selected from the group consisting of melt fracture, increased motor load, increased torque, increased head pressure, and combinations thereof.

17. The method of claim 15 or 16, wherein said surfactant is present in said combination in a range of 0.01–0.5 based on the total weight of the combination.

18. The method of claim 15 or 16, wherein said surfactant is present in said combination in a range of 0.03–0.35 based on the total weight of the combination.

19. The method of claim 15 or 16, wherein said polyethylene has a density in the range of from 0.86 to 0.940 g/cm$^3$.

20. A polyethylene combination comprising:

a) a polyethylene having a $M_w/M_n$ not exceeding 2.5, a $M_z/M_w$ not exceeding 2;

b) a surfactant selected from the group consisting of alpha-olefin sulfonates of alkali-metals, wherein said alpha-olefin group has a carbon number greater than 6;

c) and a styrene-butadiene-styrene (SBS) copolymer having a styrene content of from 8–55% by weight of the copolymer, wherein said surfactant is present in said polyethylene combination up to about 1 weight percent based on the total weight of the polyethylene and SBS copolymer.

21. The method of claims 1, 10, 11, 15, or 16 wherein said surfactant melts below 240° C.

* * * * *